Aug. 18, 1970   B. L. CORDRY   3,525,095
COMPENSATION FOR PRECIPITATION ATTENUATION
Filed Aug. 6, 1968   2 Sheets-Sheet 1

PENETRATION COMPENSATION WAVEFORMS

INVENTOR
BURTON L. CORDRY
BY
ATTORNEY

Aug. 18, 1970   B. L. CORDRY   3,525,095
COMPENSATION FOR PRECIPITATION ATTENUATION
Filed Aug. 6, 1968   2 Sheets-Sheet 2

BURTON L. CORDRY
INVENTOR

United States Patent Office 3,525,095
Patented Aug. 18, 1970

3,525,095
COMPENSATION FOR PRECIPITATION ATTENUATION
Burton L. Cordry, Glenarm, Md., assignor to The Bendix Corporation, a corporation of Delaware
Filed Aug. 6, 1968, Ser. No. 750,602
Int. Cl. G01s 9/02
U.S. Cl. 343—7　　　　　　　　　8 Claims

ABSTRACT OF THE DISCLOSURE

Compensating means for precipitation attenuation in weather radars in which the video return is threshold detected, integrated and applied to increase the gain of the radar receiver.

---

The present invention relates to weather radar. More particularly it relates to means for compensating for the attenuation of radar signals caused by heavy precipitation thus providing increased penetration of storm areas for an improved radar presentation of the weather situation.

Weather radar is now in common use in aircraft to plot storm areas lying close to the course of the aircraft. The pilot is thereby alerted to the presence and location of areas of high atmospheric turbulence and may select a course to avoid such areas for the safety of the aircraft and comfort of its passengers. Weather radars designed for use are pulsed, sector scanning types with plan position indicators (PPI) for presentation of the weather patterns encountered. The radar returns, or targets, are provided by precipitation, usually raindrops, which are illuminated by the radar transmitter signal and scatter and reflect a portion of the signal back towards the radar. The greater the rate of the precipitation, the greater is the intensity of the return. Consequently the brighter areas appearing on the radar scope are those containing the heaviest precipitation and most likely to include dangerous turbulence. Due either to greater scattering or absorption, the attenuation of radar signals increases as the rate of precipitation increases. The result of such attenuation is to obscure or diminish the apparent size or boundaries of storm areas located beyond and on the same radials as a nearer area of heavy precipitation. Low frequency radar signals are less attenuated by precipitation than are high frequency signals. The use of low frequency radars is often justified on that basis although many practical considerations, especially in the case of airborne radars, argue for the use of higher radar frequencies.

The principal object of the present invention is to provide means for compensating for the attenuation of radar signals caused by heavy precipitation so that a more accurate presentation of storm boundaries may be obtained.

In brief, since precipitation attenuation results in part from scattering a correlation exists between attenuation and the intensity of the return signals. The invention comprises means for increasing the radar receiver gain as a function of the video signal. In its preferred embodiment, the sensitivity time control (STC) signal is modified by video signals which exceed a certain threshold so that the STC provides less than the usual amount of reduction in receiver gain.

Figure 1:
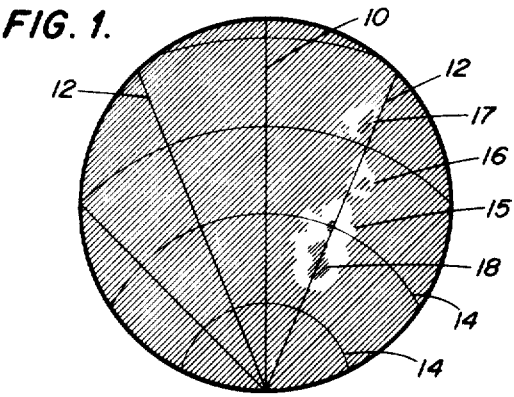
FIG. 1 is a pictorial representation of the PPI of a conventional weather radar.
Figure 2:
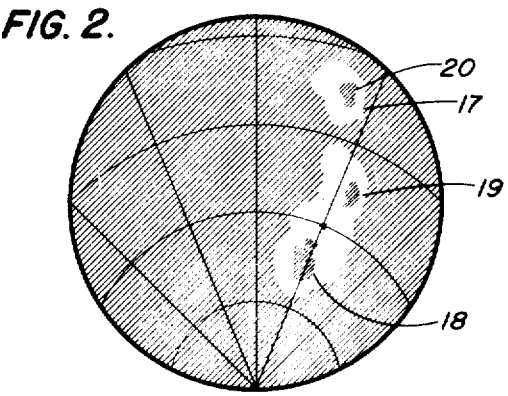
FIG. 2 is a similar representation showing the improvement afforded by the invention in the presentation of the same weather situation as shown in FIG. 1.

FIG. 1 is typical of the presentation of a weather situation provided an aircraft pilot by a conventional weather radar. A mask on the scope face provides a lubber line 10 and relative bearing marks 12 to assist the pilot in setting a course. Concentrac range marks 14 are generated by the beam trace during scan. Precipitation areas 15, 16 and 17 appear as bright areas on the normally dark scope face. Area 15 contains dark cells 18 resulting from the operation of the contour circuit. A contour circuit conventionally comprises a threshold detector to which the video is applied. Whenever the amplitude of the video exceeds a preset threshold, a blanking signal is applied to the indicator. Thus storm areas containing the most intense precipitation appear as dark cells surrounded by a luminous periphery. FIG. 2 portrays the same situation but with the compensation means of the invention in operation. The high attenuation caused by the heavy precipitation of cell 18 reduces the amplitude of returns from storms 16 and 17 located on radial bearings from the aircraft which pass through cell 18. When compensation is applied for such attenuation, the appearance of the more distant storms is very nearly the same as they would be if there were no intervening mass of precipitation from storm 15. Thus it will be seen that storm 16 is more extensive in area than it appears to be from FIG. 1 and that what appears to be moderate precipitation in FIG. 1 is actually a cell 19 of heavy precipitation. Also, FIG. 2 shows storm 17 to be greater in area and to include a cell 20 of heavier precipitation. The means of the invention therefor provide the pilot with a clearer, more accurate representation of the weather situation, within the normalized range of his radar.

Figure 3:
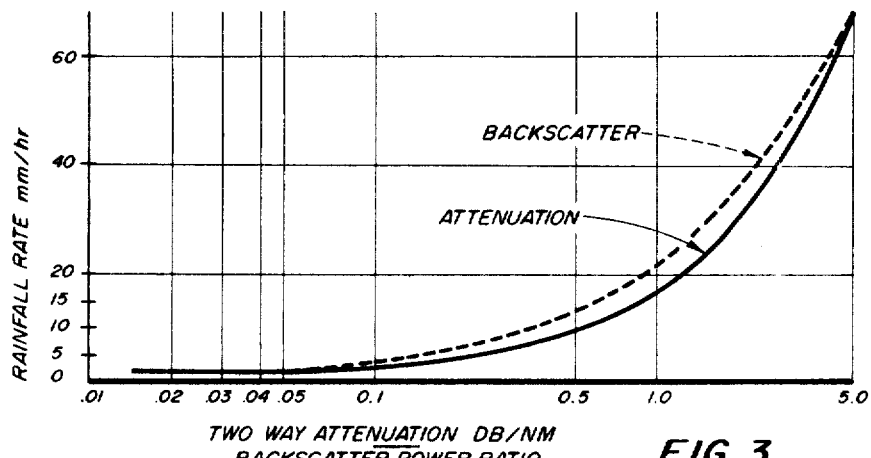
FIG. 3 is a chart showing the relationships between attenuation and rainfall rate and backscatter power ratio and rainfall rate.

FIG. 3 illustrates the theoretical basis of the invention. The solid line curve is a plot of values of the two-way attenuation in db. over a one nautical mile path for various rainfall rates. It is not possible to measure this attenuation except by experimental means which are impractical for operational radars. However, increase in rainfall rate results in an increase of the amplitude of return signals, assuming constant incident power. The backscatter power ratios are plotted for various rainfall rates as the dashed-line of FIG. 3. This figure shows that even though the curves for backscatter and attenuation do not coincide the shape of the curves is similar. Therefore, by integrating with respect to time, video signals having significant amplitudes, a compensation factor results which approximates the product of the distance through a storm cell and the attenuation per unit distance at the prevailing rainfall rate.

Figure 4:
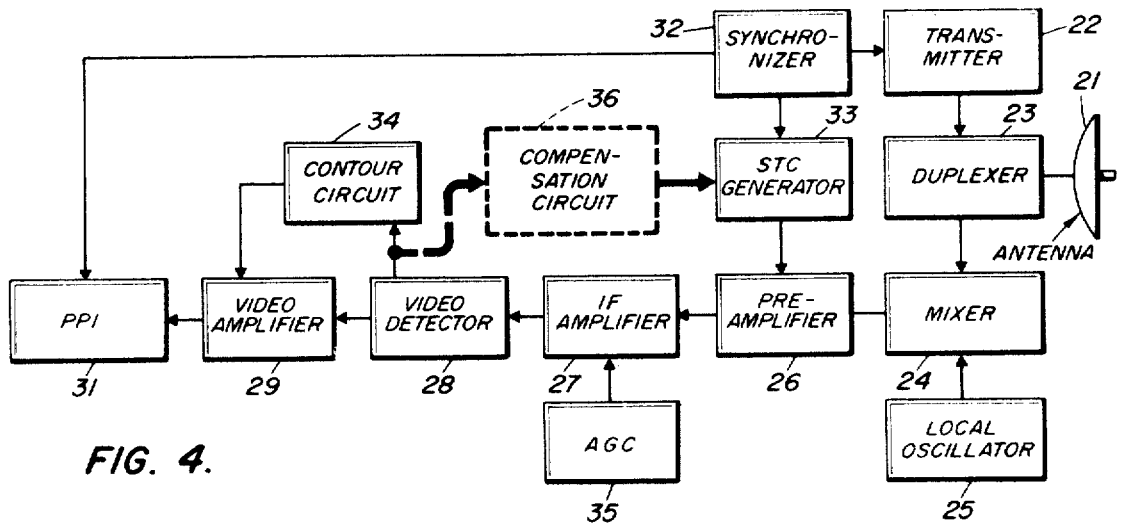
FIG. 4 is a functional block diagram of a weather radar with the modification of the invention shown in dashed-lines.
Figure 5:
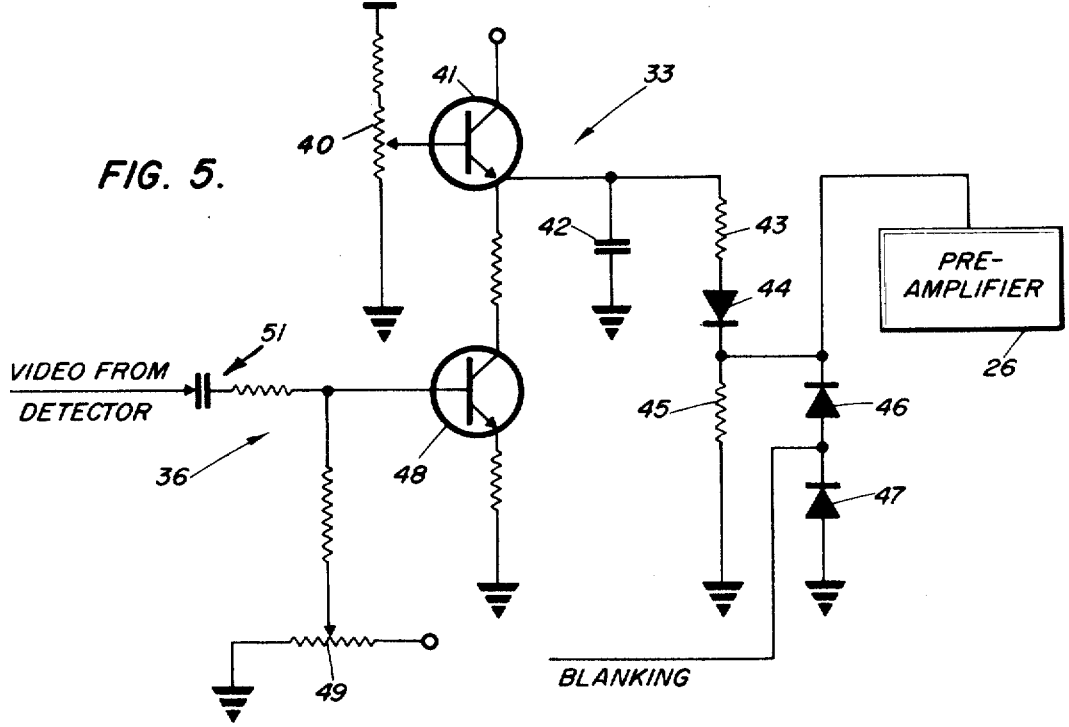
FIG. 5 is a schematic of a portion of the STC circuit modified in accordance with the invention.

FIGS. 4 and 5 illustrate the preferred means for implementing the invention. FIG. 5 is a block diagram of a weather radar which is conventional, except for the modification of the invention. The radar will be briefly described. A parabolic dish antenna 21 radiates pulses of microwave energy generated by a transmitter 22 and receives the reflections of such pulses from raindrops or other precipitation. A duplexer 23 separates outgoing from incoming signals and conducts the incoming or received signals to a mixer 24. The mixer 24 heterodynes the received signals against that of a local oscillator 25 to reduce the frequency of the received signals to an intermediate value. The output of mixer 24 is amplified first in a preamplifier 26, then in an intermediate frequency amplifier 27 and detected at 28 to provide video signals which are amplified at 29 and then used to modulate the intensity of the cathode beam of a PPI 31. A synchronizer 32 controls the operation of the radar by repetitively providing a trigger to pulse the transmitter on, a trigger to reset an STC generator 33 and triggers or waveforms to cause retrace and generation of the range sweep of PPI 31 synchronously with the generation of transmitter pulses. A contour circuit 34 supplies a blanking or inhibiting signal to video amplifier 29 whenever the video signal amplitude exceeds a certain threshold thereby preventing the high amplitude video signals from passing to the PPI with the result that areas containing high precipitation rates manifested by strong video returns are plotted as the dark cells 18 of FIG. 1.

Sensitivity Time Control is a feature which causes the receiver gain to be reduced to the minimum operating value at the beginning of each range sweep and then the gain is increased at the controlled rate of 6 db. per octave as the range sweep progresses. The purpose of STC is to normalize the receiver gain so that targets of equal dimensions and properties located at, say 20 miles range and at 60 miles range will produce equal amplitude video signals at the output of amplifier 29. Such an arrangement prevents close reflectors from causing unrealistic operation of the contour circuit and undesired blooming of the PPI presentation at near ranges.

An AGC circuit 35 performs the usual service of controlling the receiver gain as an inverse function of the average background noise to prevent saturation of the receiver by noise.

The modification of a conventional radar which most readily accomplishes the purposes of the invention is shown in dashed-lines. The STC generator 33 may simply comprise a resistor-capacitor discharge circuit which is charged to a level corresponding to minimum range receiver gain by the synchronizer trigger pulse and which possesses the proper time constant to yield the desired gain change rate of +6 db. per octave of range. Video signals are applied through a compensation circuit 36 to the STC generator to cause the circuit to discharge more rapidly in an amount dependent both upon the duration and amplitude of the video. The operation of the compensation circuit results in an increase in receiver gain as a function of the video signal amplitude whereas the contour circuit 34 operates in the opposite sense to cause the video to be blanked, when it exceeds the contour threshold.

FIG. 5 illustrates the structure of the STC generator 33 and compensation circuit 36. The STC generator 33 includes a switching transistor 41 which is momentarily rendered conductive by a trigger pulse applied to its base from synchronizer 32. Conduction of transistor 41 charges a capacitor 42 to a voltage level corresponding to the desired minimum gain from preamplifier 26 as set up by potentiometer 40. When the trigger pulse disappears, transistor 41 reverts to a non-conductive state and capacitor 42 commences to discharge through resistor 43, diode 44 and resistor 45. The forward resistance of diode 44 is negligible, so that the time constant of the discharge circuit is the product of the value of capacitor 42 and the sum of the resistances of resistors 43 and 45. Resistors 43 and 45 form a voltage divider for convenience in setting the level of control voltage to preamplifier 26 while diode 44 prevents blanking pulses which may be applied to preamplifier 26 through diodes 46 and 47 during retrace from affecting the charge of capacitor 42.

The compensating circuit 36 includes a transistor 48 which is biased to be normally non-conductive by the voltage applied to the base thereof from potentiometer 49. Video signals from detector 28 are coupled to the base of transistor 48 by a network 51. Whenever the video signals are of significant amplitude from the standpoint of attenuation, they overcome the threshold level determined by the setting of potentiometer 49, transistor 48 conducts an amount dependent upon the excess video amplitude. The source of such conduction is the charge on capacitor 42. Consequently the compensating circuit causes the STC to discharge more rapidly as a function of the power of the video signals in excess of a preset threshold and for a time period equal to the duration of the target return, and thereby increases the gain of the receiver in accordance with a function approximating the time integral of the excess video.

Figure 6:
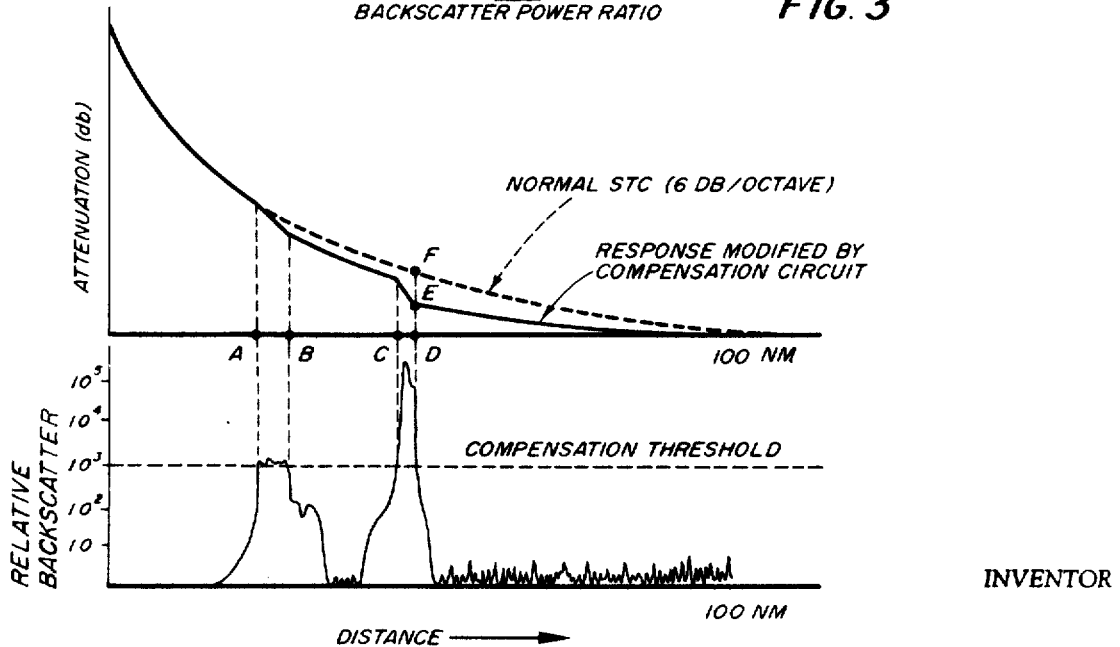
FIG. 6 is a waveform diagram showing a typical STC function and the modification effected therein as a function of video return.

FIG. 6 illustrates the waveform of the output of the STC generator as modified by the invention. The normal STC curve is an exponential form characteristic of an RC discharge circuit with a fixed time constant. At range A and continuing to range B video signal slightly in excess of the compensation threshold is observed. Such a signal would result from a storm cell of appreciable distance across and having a moderate rainfall rate. The STC waveform then follows an exponential curve corresponding to a slightly reduced time constant until the time corresponding to range B is reached. Thereafter, from range B to range C, the waveform decays at the initial rate. At range C, a less extensive but more intensive area of precipitation is encountered. This produces a video signal considerably greater than the compensation threshold, resulting in decay of the wave along a curve corresponding to a much shorter time constant. At a time corresponding to range D, the video again drops below the compensation threshold and the wave decays thereafter at the initial rate. At range D, the receiver gain has been increased by amount EF over the receiver gain without compensation. Moreover, the amount of increase in gain is determined by a function approximating the time integral of the backscatter, which as demonstrated above, is an appropriate means for compensating for a broad range of values of precipitation attenuation.

It should be noted that for simplicity and economy, the preferred embodiment of the invention comprises a modification of the STC generator where there exists an integrating capacitor and gain controlling means. Obviously separate integrating and gain controlling means could be substituted without departing from the scope of the invention.

The invention claimed is:

1. In a weather radar, including a transmitter and a receiver, means for compensating for precipitation attenuation, comprising:

means for determining the strength of precipitation returns;
  means for integrating said returns for the time period encompassing those returns; and
  means for increasing the radar receiver gain as a function of said integrated returns.

2. Compensating means as claimed in claim 1 wherein said means for determining the strength of precipitation returns comprises a threshold detector to which received video signals are applied and which conducts video signals only in excess of a predetermined level.

3. Compensating means as claimed in claim 2 wherein said integrating means comprises a capacitor connected to said threshold detector.

4. Compensating means as claimed in claim 3 wherein said radar receiver includes amplifying means having a gain responsive to a control voltage and wherein said capacitor is connected to supply at least a portion of said control voltage.

5. In a weather radar including a transmitter and a receiver, said receiver including amplifying means having sensitivity time control for increasing the gain thereof in accordance with a predetermined function of time, means for compensating for precipitation attenuation, comprising:

means for determining the strength of radar signals returned by precipitation;
  means for integrating with respect to time radar returns in excess of a predetermined level; and means for modifying said sensitivity time control function in accordance with said integrated returns.

6. Compensating means as claimed in claim 5 wherein said sensitivity time control includes a resistor-capacitor circuit providing a time-varying funciton for control of said amplifying means and wherein said intergrating means is comprised by the capacitor of said sensitivity time control.

7. Compensating means as claimed in claim 6 wherein the capacitor of said sensitivity time control is charged to a fixed level simultaneously with the transmission of a radar signal and thereafter discharges through said resistor to provide a normal time varying control function and wherein said means for determining the strength of radar return signals and said means for modifying said control function are comprised by a transistor connected to discharge said capacitor; by the equivalence of a variable resistor in parallel with said resistor.

8. Compensating means as claimed in claim 7 with additionally; means normally biasing said transistor nonconductive to normal background noise; and means applying received video signals to said transistor to render the same conductive whenever the amplitude of said video signals exceeds said transistor bias.

References Cited

UNITED STATES PATENTS 3,149,332    9/1964    Kocher.
3,447,153    5/1969    Maguire.

RODNEY D. BENNETT, Jr., Primary Examiner

T. H. TUBBESING, Assistant Examiner